UNITED STATES PATENT OFFICE.

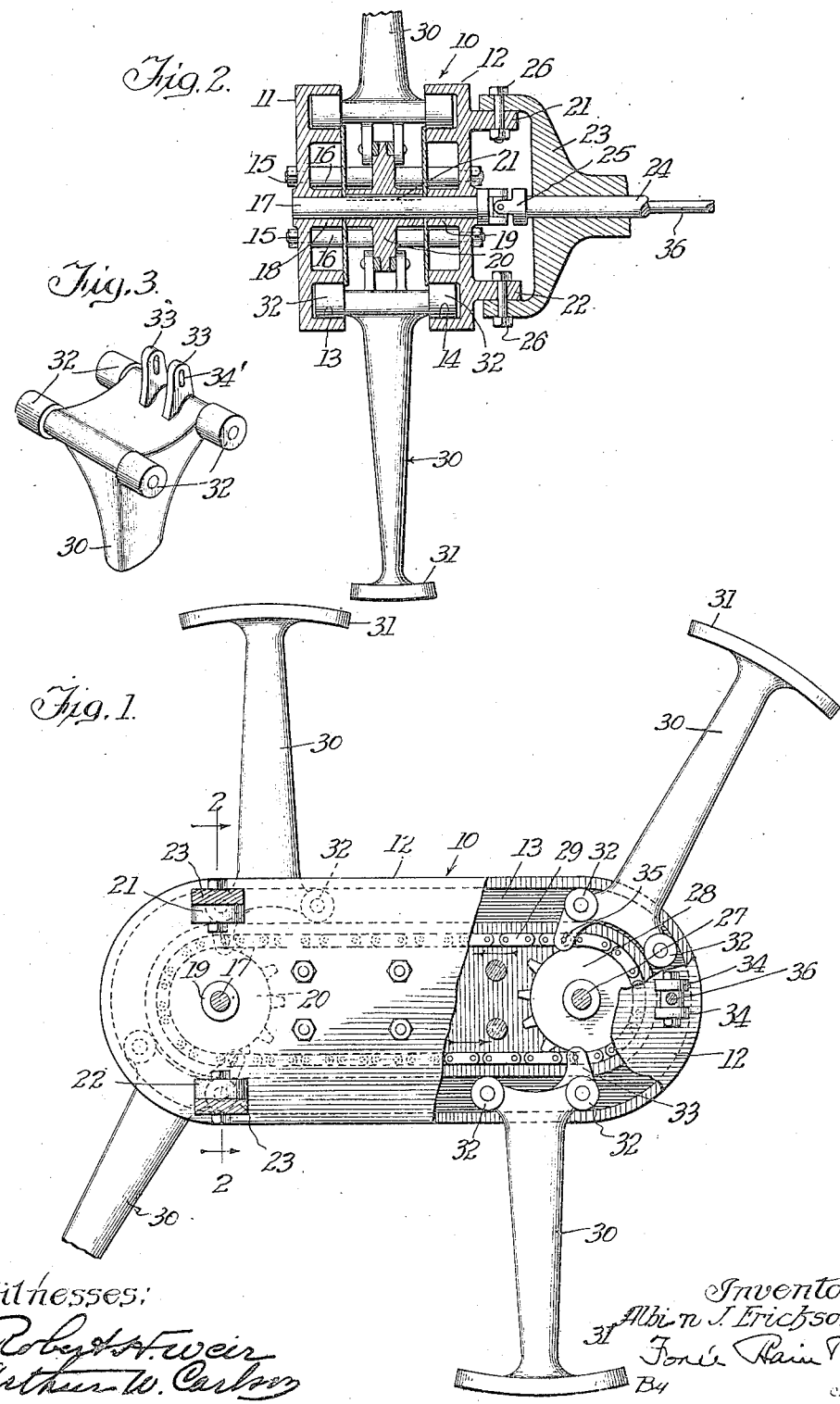

ALBIN J. ERICKSON, OF CHICAGO, ILLINOIS.

VEHICLE-PROPELLING DEVICE.

1,167,806.  Specification of Letters Patent.  Patented Jan. 11, 1916.

Application filed June 30, 1915. Serial No. 37,164.

*To all whom it may concern:*

Be it known that I, ALBIN J. ERICKSON, a citizen of the United States, residing at Chicago, in the county of Cook and State of Illinois, have invented certain new and useful Improvements in Vehicle-Propelling Devices, of which the following is a specification.

My invention relates to vehicle propelling devices, for use with self driven vehicles and especially with automobile trucks, agricultural traction vehicles or engines, and other such structures, and has more particular reference to a device which has longitudinal movement in reference to the vehicle, the attached end of which moves along a longitudinally extending guide-way, carried by the vehicle chassis or body.

Some of the objects of my invention are to simplify and improve the construction of devices of this type, whereby to enhance their efficiency and increase their usefulness. To provide means whereby the propelling device may be easily turned upon its horizontal bearing to change the direction of progress of the vehicle.

Other and further objects of my invention will become readily apparent to persons skilled in the art from a consideration of the following description when taken in conjunction with the drawings, wherein:—

Figure 1 is a side elevation of one member of my improved propelling device, of which there must be at least two for each vehicle, broken away, showing parts in section. Fig. 2 is a transverse section taken on line 2—2 of Fig. 1. Fig. 3 is a perspective view of a fragment of the upper end of one of the legs.

In all the views the same reference characters are employed to indicate similar parts.

In carrying my invention into effect I may use any form of chassis, or vehicle body, and attach thereto a frame or casing 10, consisting of spaced apart plates or side members 11 and 12, each provided with hollow top and bottom and end channels 13 and 14. The plates 11 and 12 are held in place by spacing bolts 15 and sleeves 16.

A drive shaft 17, which may be connected to any means for propelling the vehicle, passes through bearings 18 and 19, provided in the plates and through a sprocket drive wheel 20, secured thereto, as by a key 21. Plate 12 which is the inside plate, is provided with projecting brackets 21 and 22 for swivel engagement with an axle 23, and the drive shaft section 17 is connected to a drive shaft section 24, which latter has bearings in the axle 23, by means of a universal joint 25, so that the traction device may be swiveled in any direction, for the purpose of changing the direction of progress of the vehicle, upon the bearings provided by the bolts 26—26. Another shaft 27 passes through the casing, provided by the plates 11 and 12, at the other end of the casing, and carries a sprocket wheel 28, around which passes a drive chain 29, which also passes around the drive sprocket wheel 20. Secured to the chain, at suitable intervals, are a series of legs 30, which may be of any suitable length, each provided with a foot 31 on its free projecting end and carrying four laterally projecting rollers 32, which track within the channels 13 and 14 provided in the respective plates. Each of the legs is provided with projecting ears 33 for engagement with the chain 29, having slotted perforations 34' therein to receive a bolt, or pin 35, which passes through the chain, to secure the legs thereto.

Projecting inwardly from the plate 12 are ears 34—34 by means of which a rod 36 connects the inner plates of opposite tractors together.

Assume that the device, shown in Fig. 1, is traveling from the right to the left, the leg in the vertical plane is about to leave contact with the roadway and the one immediately in front is about to make contact therewith. The arrangement is such that the leg approaching the roadway will make contact therewith about the time or before the leg leaving it will have been raised up, by means of the chain 29, out of contact with the roadway, so that when it becomes necessary to turn the vehicle, each of the traction devices will always be standing substantially upon one leg and therefore will be easily and quickly turned. Any number of legs 30, may be employed, however, and may be of any suitable length desired. After a leg has left contact with the earth and another leg has made contact therewith, the former leg is returned to the upper channel by means of chain 29 and moved forwardly to again engage the roadway in its proper order. My device does not depend so much upon rotary traction with the roadway, as the vehicle is moved forward while the leg is passing through the straight portion of the channel contained in the casing. The leg after once touching the roadway remains practically stationary while the vehicle moves forward and after it has moved forward until the leg has reached a point where it is about to leave the roadway another leg is moved in its place and the vehicle is then moved forward with respect to that leg and so on during the progress of the vehicle.

Having described my invention, what I claim as new and desire to secure by Letters Patent of the United States is:—

1. In a device of the character described, a casing having opposite, continuous channels in each of its side walls; a series of legs having ends projecting between the side walls, rollers carried on each side of the legs and projecting into said channels; a chain in said casing to which said legs are attached and means to drive the chain.

2. In a device of the character described, a casing having opposite upper and lower continuous channels in each of its side walls; a series of intermediate legs arranged between said walls and having rollers projecting laterally into said channels; a chain in said casing, to which said legs are attached at uniform intervals; a power shaft section extending into said casing; a sprocket wheel carried by said shaft to drive the chain; another sprocket wheel in the rear of the casing over which said chain passes, and connecting means at the rear of the casing for connection with a similar driving device on the opposite side of a vehicle.

3. In a device of the character described, the combination of two oppositely disposed, spaced apart plates, having opposite upper and lower channels and curved connecting channels at their ends; a driving chain within said casing; a driving sprocket wheel within the casing over which the chain passes; another sprocket wheel in the rear of the casing; a shaft section for driving the front sprocket wheel; a fixed axle to which the device is swiveled; a drive shaft carried by the axle; a universal joint connecting said shaft sections and legs connected at uniform intervals to the chain and having rollers on each side projecting laterally into said channels.

4. In a device of the character described, a casing having opposite, continuous channels in each of its side walls, a series of legs having their inner ends guidedly supported within said channels, a chain in said casing to which said legs are attached, means for pivotally mounting the casing on a vertical axis, the number of the legs being such that one comes in contact with the ground as another is about to leave the ground.

In testimony whereof I hereunto set my hand in the presence of two subscribing witnesses.

ALBIN J. ERICKSON.

In the presence of—
STANLEY W. COOK,
FORÉE BAIN.